United States Patent
Kwon et al.

(12) United States Patent (10) Patent No.: US 8,670,440 B2
(45) Date of Patent: Mar. 11, 2014

(54) DATA TRANSCEIVING APPARATUS AND METHOD IN CENTRALIZED MAC-BASED WIRELESS COMMUNICATION SYSTEM

(75) Inventors: Hyoung Jin Kwon, Chungcheongbuk-do (KR); Jin Kyeong Kim, Daejeon (KR); Yong Sun Kim, Suwon-si (KR); Seung Eun Hong, Daejeon (KR); Kyeongpyo Kim, Daejeon (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 95 days.

(21) Appl. No.: 12/464,122

(22) Filed: May 12, 2009

(65) Prior Publication Data

US 2009/0285149 A1   Nov. 19, 2009

(30) Foreign Application Priority Data

May 13, 2008  (KR) .................. 10-2008-0044053
Jan. 20, 2009  (KR) .................. 10-2009-0004580

(51) Int. Cl.
*H04L 12/28*   (2006.01)

(52) U.S. Cl.
USPC ........................ 370/351; 370/315; 370/252

(58) Field of Classification Search
USPC ......... 370/329, 216, 386, 325, 338, 349, 389, 370/443, 406, 410, 252, 254, 248, 249, 260, 370/261, 262, 263, 328, 330, 332, 333, 340, 370/341, 347, 442, 337, 351; 455/452.2, 455/67.11, 69, 507, 508

See application file for complete search history.

(56) References Cited

U.S. PATENT DOCUMENTS

| | | | |
|---|---|---|---|
| 6,731,905 B2 | 5/2004 | Ogino et al. | |
| 7,110,366 B2 * | 9/2006 | Hulyalkar et al. | 370/252 |
| 7,321,578 B2 | 1/2008 | Rios | |
| 7,532,594 B2 * | 5/2009 | Lin et al. | 370/329 |
| 7,706,411 B2 * | 4/2010 | Wakumoto et al. | 370/475 |
| 2003/0050009 A1 * | 3/2003 | Kurisko et al. | 455/41 |
| 2004/0235489 A1 * | 11/2004 | Kwon | 455/452.2 |
| 2006/0280143 A1 * | 12/2006 | Dabak et al. | 370/329 |
| 2008/0130794 A1 | 6/2008 | Chong et al. | |
| 2008/0219222 A1 * | 9/2008 | Lo et al. | 370/337 |
| 2009/0046653 A1 * | 2/2009 | Singh et al. | 370/330 |
| 2009/0059890 A1 * | 3/2009 | Cordeiro et al. | 370/348 |
| 2009/0073954 A1 * | 3/2009 | Maltsev et al. | 370/347 |

FOREIGN PATENT DOCUMENTS

| | | |
|---|---|---|
| KR | 2002-0083604 | 11/2002 |
| WO | 2008/100100 | 8/2008 |

* cited by examiner

*Primary Examiner* — Abdullah Riyami
(74) *Attorney, Agent, or Firm* — Staas & Halsey LLP (57) ABSTRACT

A data transceiving apparatus and method in a centralized MAC-based wireless communication system are provided. The data transceiving method of a centralized MAC-based device may include: setting a direct path to a device and a relay path to a piconet coordinator (PNC); selecting any one of the direct path and the relay path; and transceiving data via the selected path.

15 Claims, 6 Drawing Sheets

DATA TRANSCEIVING APPARATUS AND METHOD IN CENTRALIZED MAC-BASED WIRELESS COMMUNICATION SYSTEM

CROSS-REFERENCE TO RELATED APPLICATIONS

This application claims the benefit of Korean Patent Application No. 10-2008-0044053, filed on May 13, 2008, and Korean Patent Application No. 10-2009-0004580, filed on Jan. 20, 2009, in the Korean Intellectual Property Office, the entire disclosures of which are hereby incorporated by reference.

BACKGROUND

1. Field

Example embodiments relate to a data transceiving apparatus and method in a centralized Media Access Control (MAC)-based wireless communication system, and more particularly, to a data transceiving apparatus and method which may smoothly transceive data using a relay path via a piconet coordinator (PNC) when a channel state is not stable, or when a direct path in a line of sight (LOS) among devices is blocked, in a centralized MAC-based wireless communication system.

This work was supported by the IT R&D program of MKE/IITA. [2007-S-002-02, Development of Multi-Gigabit Air Interface Technology]

2. Description of the Related Art

In a centralized Media Access Control (MAC)-based wireless communication system, a currently used channel may be blocked or channel state may be deteriorated due to a person or an obstacle.

In general, since a person or an obstacle may move, communication blockage may be easily resolved. However, since data may be exchanged at high speed of 3 Gbps in a 60 GHz band wireless communication system, a communication blockage for even a short time may cause a serious problem.

Accordingly, a data transceiving apparatus and method which may smoothly transceive data even when a currently used channel is blocked or a channel state is deteriorated due to a person or an obstacle in a centralized MAC-based wireless communication system is required.

SUMMARY

Example embodiments may provide a data transceiving apparatus and method in a centralized Media Access Control (MAC)-based wireless communication system which may smoothly transceive data using a relay path via a piconet coordinator (PNC) when a channel state is not stable, or when a direct path in a line of sight (LOS) among devices is blocked.

Example embodiments may also provide a data transceiving apparatus and method in a centralized MAC-based wireless communication system which may sequentially use a direct path and a relay path among devices, and thereby may transceive data, particularly, delay-sensitive information such as video streaming even when the direct path is blocked.

According to example embodiments, there may be provided a centralized Media Access Control (MAC)-based device, including: a path setting and beamforming unit to set a communication path to each of a device and a piconet coordinator (PNC); a path determination unit to determine whether the communication paths are available; a path selection unit to select any one of the communication paths based on a result of the determination; and a data transceiving unit to exchange data via the selected communication path.

According to example embodiments, there may be provided a data transceiving method of a centralized MAC-based device, including: setting a direct path to a device and a relay path to a PNC; selecting any one of the direct path and the relay path; and transceiving data via the selected path.

According to example embodiments, there may be provided a data transceiving method of a centralized MAC-based PNC, including: setting a communication path to each of a first device and a second device, the second device communicating with the first device; and receiving data from the first device, and transmitting the received data to the second device.

Additional aspects of the example embodiments will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

A data transceiving method in a centralized Media Access Control (MAC)-based wireless communication system according to example embodiments may be applicable to an Institute of Electrical and Electronics Engineers (IEEE) 802.15.3 Wireless Media Access Control (WMAC) technology. Hereinafter, the IEEE 802.15.3 WMAC technology is briefly described.

IEEE 802.15 Task Group 3 (TG 3) details a standard for a high rate wireless personal area network (WPAN), and WMAC may have a configuration to enable synchronization with a centralized control. IEEE 802.15.3 WPAN may basically include wireless ad-hoc networks called a 'piconet'. A single piconet may include a single piconet coordinator (PNC) and a plurality of devices. The PNC may provide timing information of the piconet through a beacon. Also, the PNC may manage a QoS requirement, a power save mode, and an access control. IEEE 802.15.3 MAC may have a structure of a superframe that may use Carrier Sense Multiple Access with Collision Avoidance (CSMA/CA) and Time Division Multiple Access (TDMA). The superframe may include a beacon, a Contention Access Period (CAP), and a Channel Time Allocation Period (CTAP). The beacon may be generated by the PNC. Also, the beacon may include piconet-related information such as a length of the superframe, a period length of CAP and CTAP, a piconet identification (ID), and synchronization information. Every device in the piconet is required to synchronize its local clock with a PNC reference clock included in the beacon. Channel-access to the CSMA/CA may be performed to transmit a command or asynchronous data in the CAP, whereas CTAP may be reserved to transmit time sensitive traffic data using TDMA. The CTAP may be scheduled to a plurality of Channel Time Allocations (CTAs) and Management Channel Time Allocations (MCTAs) to be used to transmit data and commands.

Similar to IEEE 802.11, IEEE 802.15.3 MAC may use a CSMA/CA protocol in the CAP. However, TDMA may be used in the CTAP. The CTAP may be divided into a plurality of CTAs managed by the PNC. A single CTA may basically include a start time and a reserved transmission duration. Devices may not compete with each other to use the same tine in the CTA. The CTA may be allocated to asynchronous data packet and isochronous flow by the PNC. The CTA may be allocated at each superframe to transmit isochronous data, while a predetermined time in a single superframe is required to transmit asynchronous data.

A channel time request may be made in the CAP by a device having data to be sent to the CTAP. The requested time may include a data transmission time, Short Interframe Space (SIFS), and acknowledgement (ACK). Through this, the PNC may transmit an ACK with respect to successfully sent data. The PNC receiving the request may evaluate a current channel use state and pending requests. Also, the PNC may report the CTA allocation to a beacon of a subsequent superframe, and thereby may allocate CTAs to devices. A device may use only CTA allocated to the device. That is, a device may not use a CTA allocated to other devices.

Figure 1:
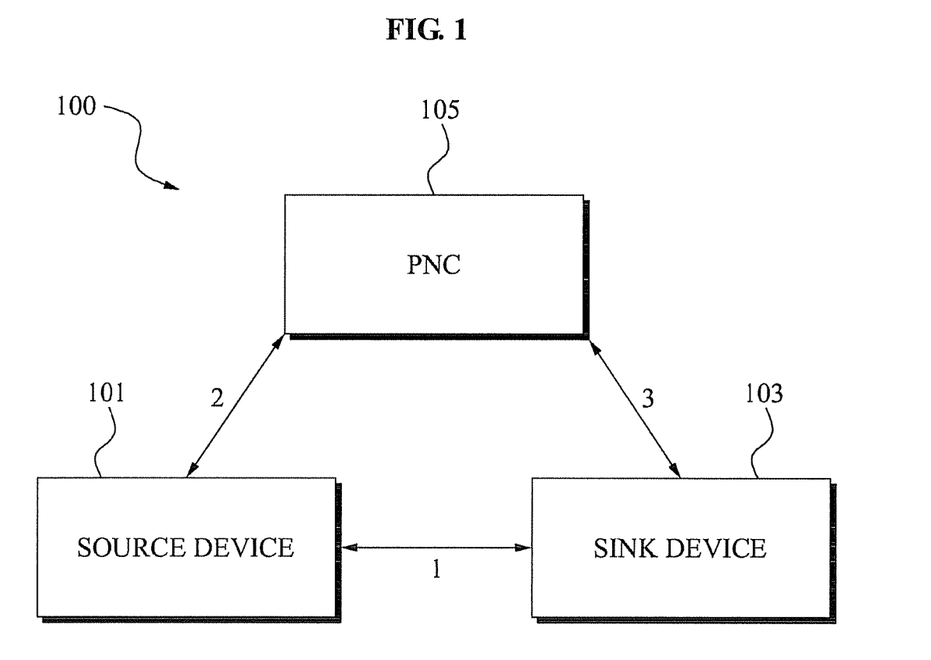
FIG. 1 illustrates a configuration of a data transceiving apparatus in a centralized Media Access Control (MAC)-based wireless communication system according to example embodiments.
Figure 2:
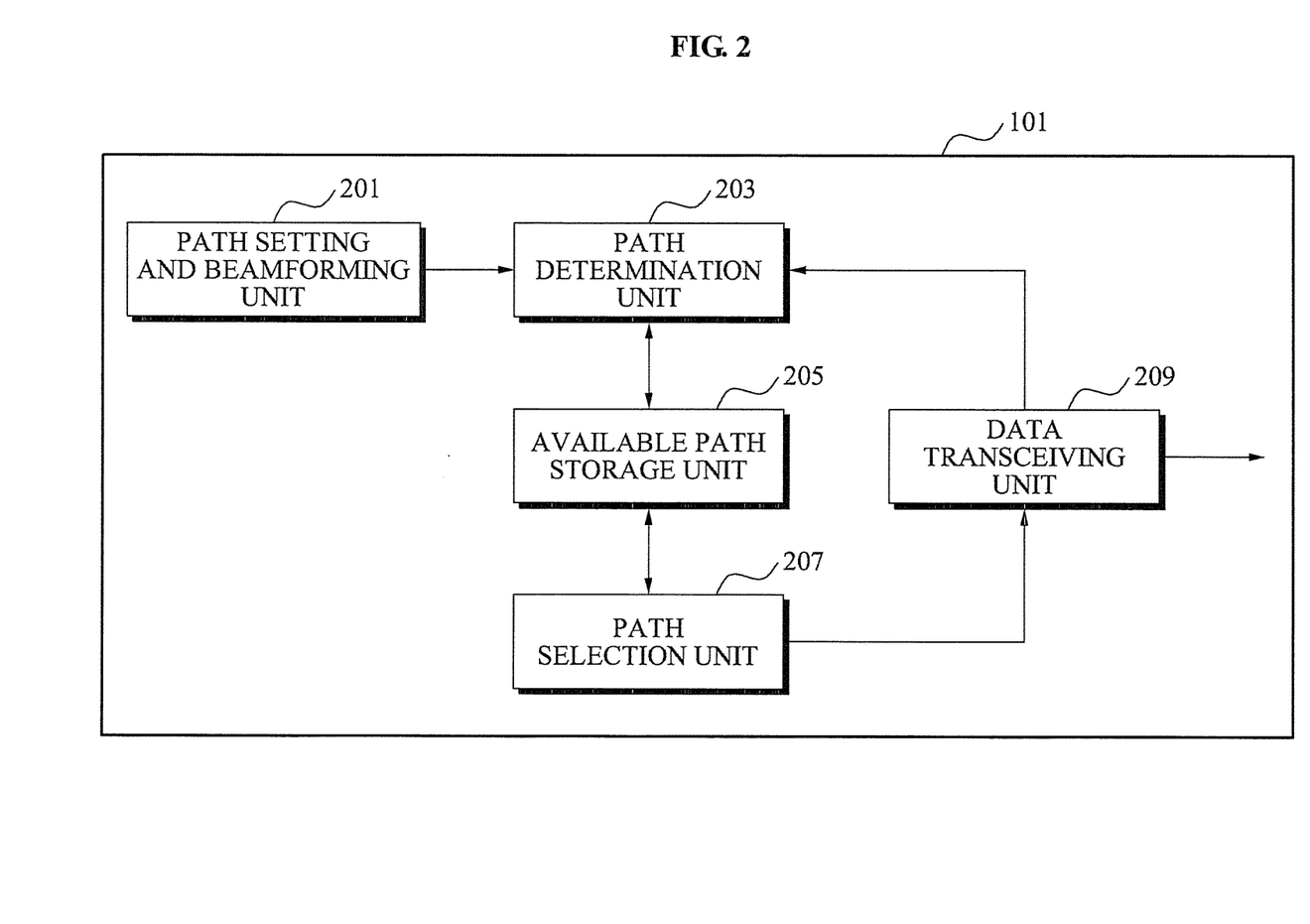
FIG. 2 illustrates a configuration of a device of FIG. 1.

FIG. 1 illustrates a configuration of a data transceiving apparatus 100 in a centralized MAC-based wireless communication system according to example embodiments. FIG. 2 illustrates a configuration of a source device 101 of FIG. 1.

Referring to FIGS. 1 and 2, the data transceiving apparatus 100 may include the source device 101, a sink device 103, and the PNC 105.

Here, the centralized MAC-based wireless communication system may use a 60 GHz band or a band in a THz range. Also, the source device 101 and the sink device 103 may be located in a line of sight (LOS).

The source device 101 and the sink device 103 may communicate data via a direct path 1 or relay paths 2 and 3. The direct path 1 may be formed in the LOS, and the relay paths 2 and 3 may be formed via the PNC 105. Also, each of the source device 101 and the sink device 103 may be a device capable of supporting a relay.

The source device 101 may include a path setting and beamforming unit 201, a path determination unit 203, an available path storage unit 205, a path selection unit 207, and a data transceiving unit 209.

The path setting and beamforming unit 201 may set the direct path 1 to the sink device 103 and the relay path 2 to the PNC 105, and form a beam. Here, the sink device 103 may be a corresponding device to communicate with the source device 101.

The path determination unit 203 may determine whether the direct path 1 and the relay path 2, set by the path setting and beamforming unit 201, are available. That is, the path determination unit 203 may detect whether communication paths including the direct path 1 and the relay path 2 are blocked, or use channel state information to determine whether the direct path 1 and the relay path 2 are available. In this instance, the channel state information may be fed back from the sink device 103 or the PNC 105 after transmitting data. Also, the source device 101 may receive the channel state information using a command frame or an ACK frame where a field of the channel state information is added. Here, the fed back channel state information may be a Signal-to-noise ratio (SNR), calculated by the sink device 103 through a preamble in a PHY end, or received signal strength indication (RSSI) measured in a radio frequency (RF) end.

The path determination unit 203 may transmit an available path to the available path storage unit 205. Specifically, the path determination unit 203 may store available paths in an order of good channel state information, or store only paths having channel state information greater than a predetermined threshold value. Since the available path storage unit 205 may periodically confirm a channel state of communication paths through the path determination unit 203, continuously changing communication path state in a wireless environment may be updated.

The path selection unit 207 may be provided with the available path from the available path storage unit 205, and select a path with a good channel state from among the paths. The path selection unit 207 may first select the direct path 1 to the sink device 103. When the direct path 1 is blocked or channel state information is less than the predetermine threshold value, the path selection unit 207 may select the relay path 2 to the PNC 105. Also, when both the direct path 1 and the relay path 2 are available, the path selection unit 207 may alternatingly make a selection according to an order of using the two paths based on a time sharing method.

The data transceiving unit 209 may transceive data from/to the sink device 103 or the PNC 105 via the selected path. In this instance, the data transmitted to the PNC 105 may be transmitted to the sink device 103 via the relay path 3.

The source device 101 and the sink device 103 may use a sector antenna or an array antenna to support omni-directional transmission. The source device 101 and the sink device 103 may not ascertain locations of other devices before setting paths to the other devices, that is, a device to communicate with or the PNC 105. Accordingly, the source device 101 and the sink device 103 may report, to the PNC 105, a response to a beacon transmitted by the PNC 105 or a CTAP channel time request for data transmission among devices through the omni-directional transmission. Conversely, when transmitting data as opposed to the beacon to the PNC 105, the source device 101 and the sink device 103 may transmit the data in a particular direction as opposed to in every direction.

The PNC 105 may provide a detour path with respect to the source device 101 and the sink device 103. Here, the detour path may indicate the relay paths 2 and 3 enabling the data communication of the source device 101 and the sink device 103, as well as the direct path 1 formed in the LOS of the source device 101 and the sink device 103. Specifically, the detour path may include the relay path 2 between the source device 101 and the PNC 105 and the relay path 3 between the sink device 103 and the PNC 105. The detour path and the direct path 1 are required to be set not to collide with each other.

The PNC 105 may transmit a beacon or transceive a command frame in a same way as a general PNC during a beacon period or a CAP. When the PNC 105 does not perform a relay function with respect to the source device 101 and the sink device 103 during a CTAP, two RF chains may be operated in a receiving (Rx) mode. However, when the PNC 105 performs an amplify-and-forward relay function, one RF chain may be operated in the Rx mode and the other RF chain may be operated in a transmission (Tx) mode by switching to each mode based on a data transmission direction.

Figure 3:
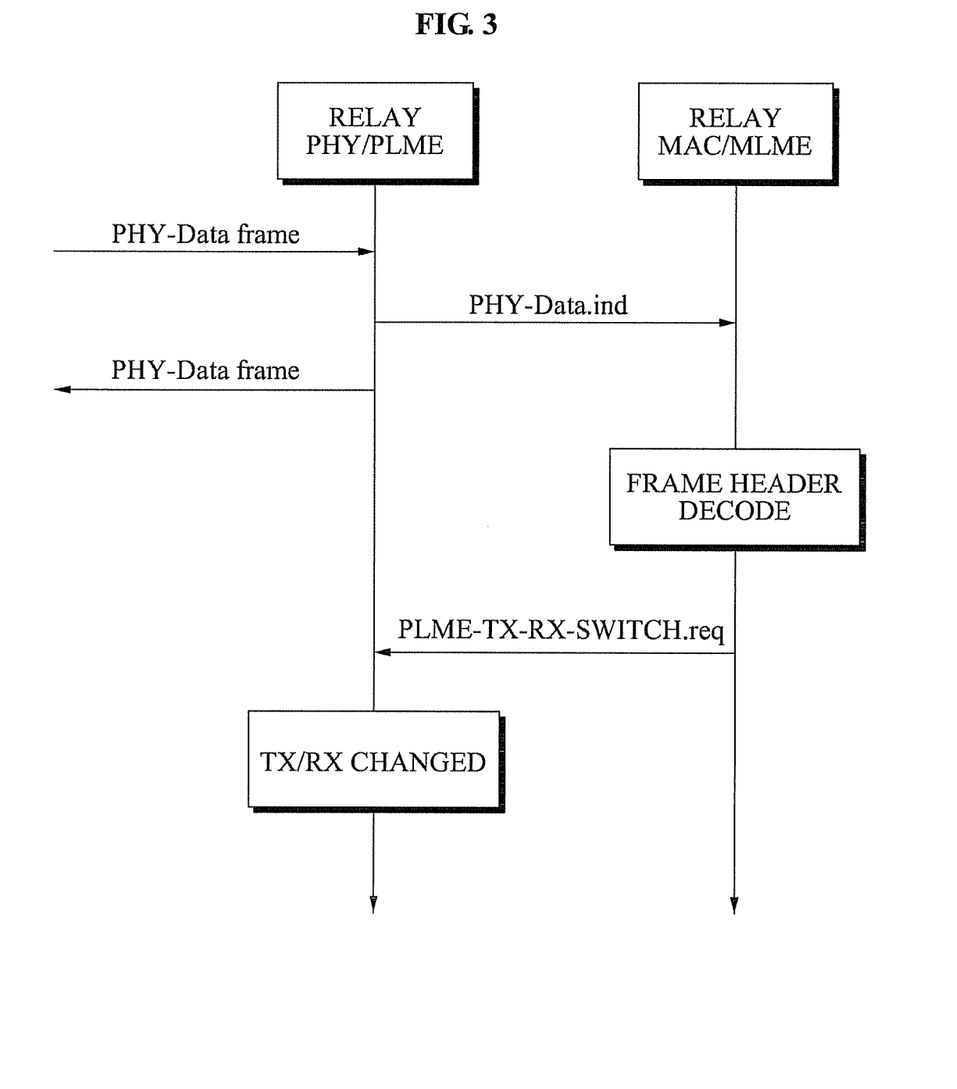
FIG. 3 illustrates a message chart with respect to an operation of a piconet coordinator (PNC) of FIG. 1.

Specifically, when the PNC 105 performs a relay function, an amplify-and-forward method may be used as illustrated in FIG. 3. That is, a packet header may be decoded while transmitting data, and it may be confirmed which ACK policy is used according to the amplify-and-forward method. Also, a mode of the RF chains may be switched. Here, the ACK policy may be any one of a No-ACK, an Immediate ACK, and a Block ACK. The amplify-and-forward method may include schemes different from a decode-and-forward scheme. A method of completely decoding a packet, correcting an error, re-encoding the error-corrected packet, and forwarding the re-encoded packet may have a lower error rate than a method of decoding and forwarding a packet without an error correcting operation. However, as a delay may increase up to two times of SIFS, the delay may not match with operation specs of the source device 101 and the sink device 103. That is, a delay may not be disadvantageous when the delay matches with the operation specs of the source device 101 and the sink device 103, since data may not be simultaneously transmitted via two paths, and interference due to a difference of arrival times of packets through the paths may not occur. Accordingly, according to example embodiments, the amplify-and-forward method may include a method of simply amplifying and forwarding, a method of performing signal-processing and forwarding to reduce a noise or interference, and a method of partially decoding and forwarding.

When an ACK policy field of a decoded packet header is the No-ACK, the PNC 105 may maintain the Tx mode and the Rx mode of the two RF chains. When the ACK policy field of the decoded packet header is the Immediate ACK, the PNC 105 may switch the RF chain in the Tx mode to the Rx mode, and the other RF chain in the Rx mode to the Tx mode. In this instance, the PNC 105 may perform switching after completing the transmission of a packet which is currently being relayed. Also, when the ACK policy field of the decoded packet header is the Block ACK, the PNC 105 may switch the modes of the two RF chains based on a transmission time of an ACK included in the decoded packet header.

The data transceiving apparatus 100 uses the PNC 105, and thereby may use the detour path via the PNC 105 when the direct path 1 is blocked due to a person or an obstacle. Accordingly, data communication may be smoothly performed between the source device 101 and the sink device 103.

Figure 4:
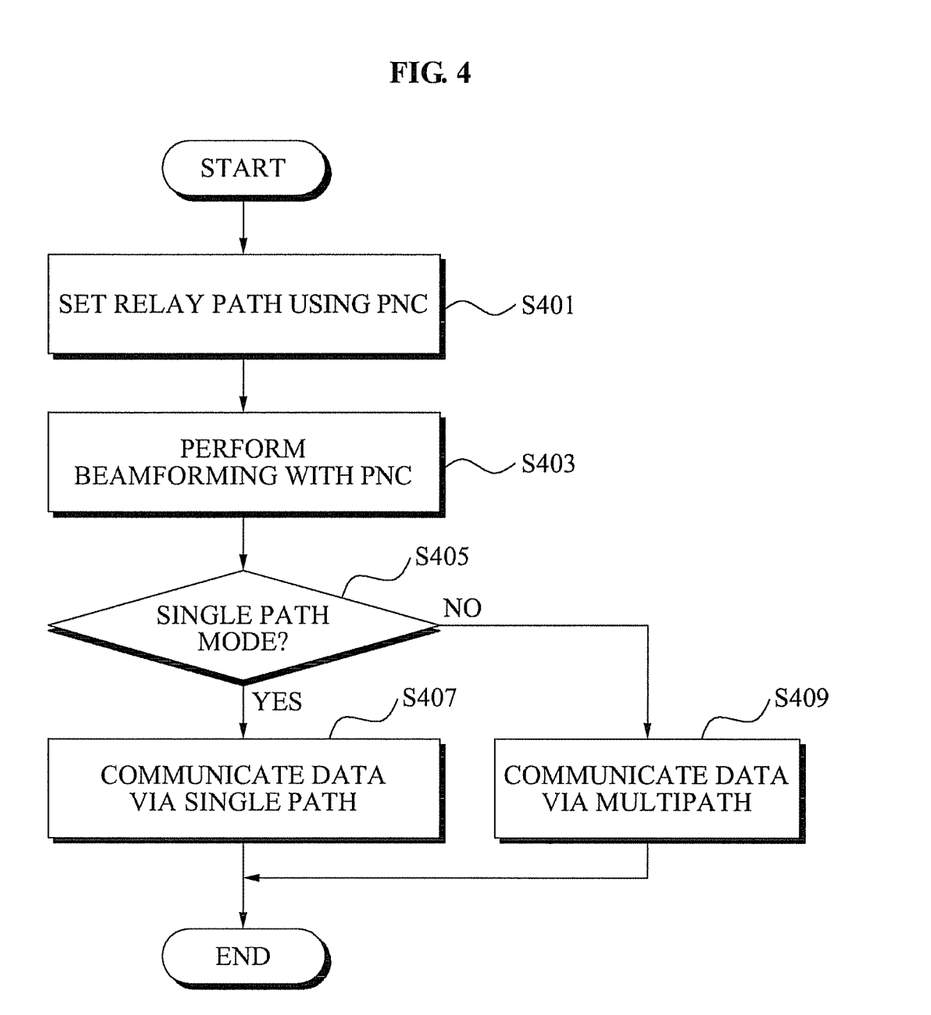
FIG. 4 illustrates a flowchart of a data transceiving method in a centralized MAC-based wireless communication system according to example embodiments.

FIG. 4 illustrates a flowchart of a data transceiving method in a centralized MAC-based wireless communication system according to example embodiments. In this instance, it may be assumed that a direct path between a source device and a sink device is previously set, and each of the source device and the sink device may be a device capable of supporting a relay.

Referring to FIG. 4, in operation S401, the source device and the sink device may set a relay path using a PNC.

The source device and the sink device may communicate with each other via the direct path in a LOS. The source device and the sink device may set at least one relay path based on a type of antenna installed in the two devices and a type of each of the source device and the sink device.

Each of the source device and the sink device may receive a beacon to retrieve the PNC, and transmit a response to the PNC. When the source device and the sink device may not receive the beacon, the beacon may be forwarded, and thus the source device and the sink device may function as the PNC. In this instance, when a beacon where a relay capability field is set as one is received from the PNC, each of the source device and the sink device may transmit a beacon where a relay support capability field is set as one to the PNC. Otherwise, even though the source device and the sink device may support relaying, the source device and the sink device may not set the relay path since the PNC does not support relaying.

Also, each of the source device and the sink device may register a PNC of a child piconet in a case that a PNC with a relay function is joined too late, and may not function as the PNC. When the PNC does not support relaying, the device may ascertain whether the PNC of the child piconet support relaying. When the PNC of the child piconet support relaying, the device may be associated with the PNC of the child piconet and set the relay path.

Therefore, when the source device and the sink device are desired to communicate using the PNC, the PNC that supports relaying and each of the source device and the sink device support a relay function, the source device and the sink device may set the relay path with the PNC. In this instance, the source device and the sink device and the PNC may transmit data using a relay information element (IE) through a beacon or a command frame in association with the relay processes. The relay IE may include relay-related information and may be newly defined using any one of information elements.

In operation S403, the source device and the sink device may perform beamforming with the PNC.

The source device and the sink device may perform beamforming with the PNC in a CAP. The CAP may be allocated for the beamforming by the PNC. Subsequently, the beamforming via a direct link between the source device and the sink device may be performed in a CTAP, in a same way as when a relay path is not used. In this instance, the CTAP may be allocated and reported by the PNC. When the beamforming of three links, that is, the direct path and two relay paths, among the source device, the sink device, and the PNC, is completed, the source device, the sink device, and the PNC may transmit data in the CTAP allocated by the PNC.

Here, although it has been described that setting of a relay path between a single PNC and devices, a plurality of relay paths corresponding to a plurality of devices may be set, when the plurality of devices support relaying. Also, the devices may set a multi-hop relay path where at least two devices may be connected in series.

In operation S405, the source device and the sink device may confirm a communication path mode.

The communication path mode between the source device and the sink device may include a single path mode and multipath mode.

Here, the single path mode may be a mode transceiving data using a single path from among multiple paths between the devices. The multipath mode may indicate a mode that transceives data alternatingly using different paths among the multiple paths between the source device and the sink device. Here, the multiple paths may include the relay path via the PNC and the direct path in the LOS between the source device and the sink device.

In operation S407, when the communication path mode is the single path mode, the data may be transceived using the single path from among the multiple paths.

Specifically, the source device and the sink device may transceive the data using any one of the direct path and the relay path. In this instance, the source device and the sink device may transceive the data using the selected path until the selected path is blocked or a channel state is deteriorated. When the selected path is blocked, the source device and the sink device may reselect another unblocked path and continue to communicate the data via the reselected path.

For example, the source device and the sink device may transceive the data using the direct path. In this instance, the direct path may be temporarily or permanently blocked or the channel state may be deteriorated due to a person or an obstacle. In this case, the source device and the sink device may transceive the data using the relay path via the PNC. In this instance, the source device and the sink device may periodically confirm the channel state among the communication paths. When the direct path is available again, the data may be transceived via the direct path again.

A path change method due to the communication path blockage or the channel state change may include an explicit method using a relay switch command and an implicit method using a communication blockage time, which is described in detail below with reference to FIGS. 5 and 6.

In operation S409, the source device and the sink device may transceive the data using the multiple paths in the multipath mode.

Specifically, the source device and the sink device may determine an order of using the direct path and the detour path, that is, the relay path. Also, the source device and the sink device may alternatingly select the direct path and the detour path based on the determined order, and transceive the data via the selected path. However, when any one of the two paths is blocked, the source device and the sink device may transceive the data using an available path. When the blocked path may be available, the source device and the sink device may transceive the data alternatingly using the multiple paths based on the determined order.

For example, the source device and the sink device may first use the direct path to transceive the data, and then use the detour path. Subsequently, the source device and the sink device may communicate with each other alternatingly using the direct path and the detour path. However, when the direct path is blocked, the source device and the sink device may communicate with each other using only the detour path. When the direct path may be available again, the source device and the sink device may communicate with each other sequentially using the direct path and the detour path.

While communicating the data, the direct path and the relay path may be managed as an available path list depending on whether the paths are available. The available path list may be updated when it is periodically confirmed whether the paths are available.

Hereinafter, the path change method between the direct path and the relay path is described in greater detail.

For example, when the direct path is blocked, the source device and the sink device may communicate with each other using the relay path via the PNC. The explicit method based on a detour command and an implicit method using a communication blockage time without using the detour command, exist.

Figure 5:
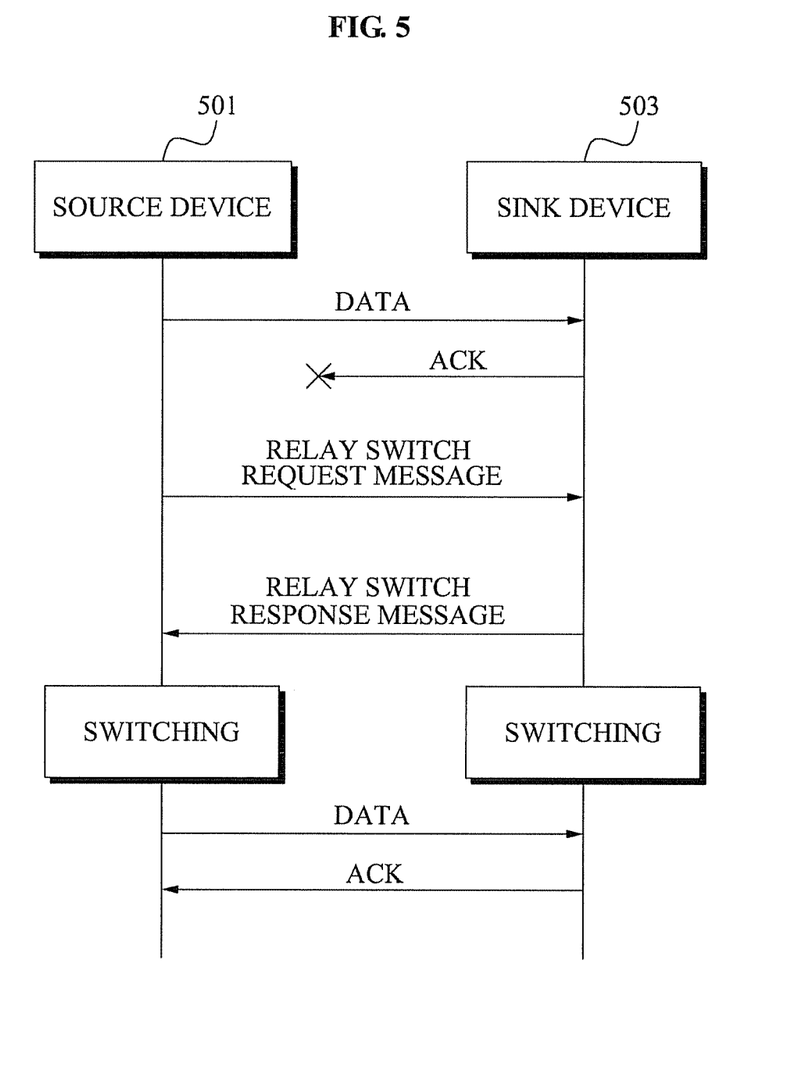
FIG. 5 illustrates an explicit method of selecting a relay path according to a detour command in a device.

FIG. 5 illustrates an explicit method of selecting a relay path according to a detour command in a device.

In the explicit method, a path may be switched using a relay switch command between devices.

Referring to FIG. 5, when a source device 501 does not receive an ACK with respect to data at least a predetermined number of times from a sink device 503 after transmitting the data, the source device 501 may transmit a relay switch request command to the sink device 503 via a relay link.

When the data is not received from the source device 501 via a direct path, the sink device 503 may control a beam towards a PNC that recognizes as a result of beamforming. When the sink device 503 may transmit a relay switch response command including an information element of a detour start duration to the source device 501 after receiving the relay switch request command. The information element of detour start duration may indicate a point of time that the detour path is used. The sink device 503 may start transmitting the data using the relay path via the PNC by switching the paths at a detour time.

The source device 501 may receive the relay switch response command, and determine the detour time through the PNC using the information element of the detour start duration included in the relay switch response command. Also, the source device 501 may start transmitting the data using the relay path via the PNC by switching the paths at the determined detour time. When the data is not communicated via the relay path at the determined detour time, the source device 501 may use the direct path using the relay switch command again. That is, the relay switch command may be used in the explicit method, and thus the detour path may be stably selected and a time to use the detour path may be adjusted. Also, when both the direct path and the detour path are blocked, a 'No Service' event may be reported to an upper layer through a MAC layer management entity (MLME), and a data transmission process may be completed. The relay switch command may be defined by a relay IE and a relay command type.

Figure 6:
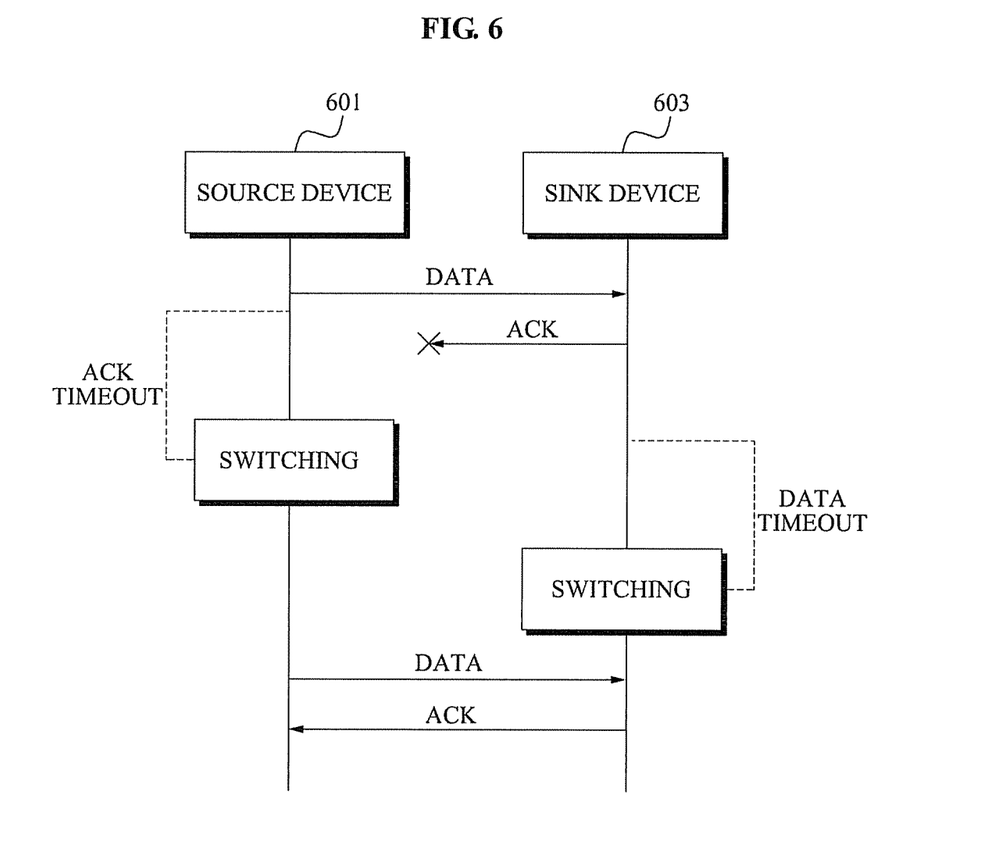
FIG. 6 illustrates an implicit method of selecting a relay path using a communication blockage time in a device.

FIG. 6 illustrates an implicit method of selecting a relay path using a communication blockage time in a device.

In the implicit method, a path may be switched using a time that data communication is blocked between devices.

Referring to FIG. 6, when a source device 601 does not receive an ACK with respect to data at least a predetermined number of times from a sink device 603 after transmitting the data, the source device 601 may transceive the data using the relay path via a PNC by switching the paths.

When the data is not received from the source device 601 for a predetermined period of time while periodically receiving the data, the sink device 603 may transceive the data using the relay path via the PNC by switching the paths.

Although the source device 601 transmits the data using the relay path via the PNC, the ACK is not received from the sink device 603, the relay path selection may be confirmed again using the explicit method. When the data is not communicated via the relay path, the devices 601 and 603 may use the direct path using a relay switch command again as the explicit method. Also, when both the direct path and the relay path are blocked, a 'No Service' event may be reported to an upper layer through an MLME, and a data transmission process may be completed.

Here, the relay-switching of the source device 601 may be performed earlier or later than the relay-switching of the sink device 603.

Since the relay switch command may not be used in the implicit method, a communication path may be switched more quickly.

According to example embodiments, when devices are in a single path mode, and a selected communication path is blocked, the communication path may be switched using the explicit method and the implicit method.

However, when the devices are in a multipath mode, the implicit method may be applied since the devices alternatingly use multiple paths. In this case, the device may not use a relay switch command, and an antenna mode setting with respect to the switching of the devices and the transceiving of the PNC is unnecessary. Accordingly, a time spent in switching communication paths may be reduced. Thus, when the devices are in the multipath mode, the switching tine may be reduced and transmission delay and loss of the data may be efficiently improved. Also, when the data is delay-sensitive information such as video-streaming, the multipath mode may be more efficient.

A data transceiving apparatus of a centralized MAC-based wireless communication system may smoothly transceive data using a multipath even when a communication path is blocked.

The data transceiving method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. A centralized Media Access Control (MAC)-based device, comprising:
    a path setting unit of a source device to set a communication path and form a beam to each of a corresponding device and a piconet coordinator (PNC);
    a path determination unit of the source device to determine, without using information received directly from the PNC, whether the communication paths are available;
    a path selection unit of the source device to select any one of the communication paths based on a result of the determination; and
    a data transceiving unit of the source device to transceive data via the selected communication path.

2. The centralized MAC-based device of claim 1, wherein the path selection unit first selects the communication path to the device, and when the selected communication path is blocked or channel state information is lower than a predetermine threshold value, selects the communication path to the PNC.

3. The centralized MAC-based device of claim 1, wherein the path selection unit alternatingly selects the communication path to the device and the communication path to the PNC.

4. The centralized MAC-based device of claim 1, further comprising:
    an available path storage unit to store an available communication path from among the communication paths.

5. A data transceiving method of a centralized MAC-based source device, comprising:
    setting a direct path and forming a beam from the MAC-based device to a receiving device;
    setting a relay path and forming a beam from the MAC-based device to a PNC;
    using time sharing as one of the ways for selecting any one of the direct path and the relay path responsive to the MAC-based device by determining, without using information received directly from the PNC, whether the communication paths are available responsive to channel blockage and channel state information; and
    transceiving data via the selected path.

6. The data transceiving method of claim 5, wherein the setting of the relay path comprises:
    receiving MAC data where a relay capability field is set as one, from the PNC; and
    transmitting MAC data where a relay support capability field is set as one to the PNC, and setting the relay path.

7. The data transceiving method of claim 5, wherein the selecting comprises:
    periodically confirming whether the direct path and the relay path are available; and
    selecting any one of the direct path and the relay path based on a result of the confirming to use the selected path until the selected path is blocked.

8. The data transceiving method of claim 5, wherein the selecting comprises:
    periodically confirming whether the direct path and the relay path are available; and
    determining an order of the direct path and the relay path based on a result of the confirming, and alternatingly selecting the direct path and the relay path based on the determined order.

9. The data transceiving method of claim 5, wherein, when any one of the direct path and the relay path is blocked or channel state information is less than a predetermined threshold value, the data is transceived via another unblocked path.

10. The data transceiving method of claim 5, wherein, when an acknowledgement (ACK) is not received from the device or the PNC for a predetermined time, the transceiving comprises:
    switching to another path different from the selected path; and
    transceiving the data via the other path.

11. The data transceiving method of claim 10, wherein the transceiving further comprises:
    transmitting, to the device, a relay switch request message for switching to the other path different from the selected path; and
    receiving a response message to the relay switch request message.

12. A data transceiving method of a centralized MAC-based PNC, comprising:
    setting a communication path and forming a beam to each of a first device and a second device, the second device communicating with the first device responsive to a source device, which will determine, without using information received directly from the PNC, whether the communication paths are available responsive to channel blockage and channel state information; and
    receiving data from the first device, and transmitting the received data to the second device.

13. The data transceiving method of claim 12, wherein the data is transmitted in an amplify-and-forward method, a packet header of the data is decoded, any one radio frequency (RF) chain of two RF chains is set as a receiving mode, and another RF chain of the two RF chains is set as a transmission mode based on the decoded packet header.

14. The data transceiving method of claim 13, wherein the amplify-and-forward method transmits the data, received through an antenna corresponding to the RF chain of the receiving mode, to an antenna corresponding to the RF chain of the transmission mode, using at least one method of amplifying and forwarding the data, a method of performing signal-processing and forwarding the data to reduce a noise or interference, and a method of partially decoding and performing signal-processing with respect to the data, re-encoding the decoded data, and forwarding the re-encoded data.

15. The centralized MAC-based device of claim 1, wherein the path determination unit detects whether the communication paths are blocked.

* * * * *